United States Patent
Tankov et al.

(10) Patent No.: US 7,676,810 B2
(45) Date of Patent: Mar. 9, 2010

(54) IDENTIFICATION OF EXECUTION CONTEXT

(75) Inventors: Nikolai D. Tankov, Sofia (BG); Samir A. Zoert, Walldorf (DE); Peter K. Matov, Velingrad (BG)

(73) Assignee: SAP AG, Walldorf (DE)

( * ) Notice: Subject to any disclaimer, the term of this patent is extended or adjusted under 35 U.S.C. 154(b) by 1259 days.

(21) Appl. No.: 10/860,839

(22) Filed: Jun. 3, 2004

(65) Prior Publication Data

US 2005/0273783 A1 Dec. 8, 2005

(51) Int. Cl.
G06F 9/46 (2006.01)
G06F 9/44 (2006.01)

(52) U.S. Cl. ............ 718/108; 718/100; 718/104; 717/116; 717/127

(58) Field of Classification Search ............ 718/1–108; 717/108, 116, 127, 164, 102, 131, 130; 719/328
See application file for complete search history.

(56) References Cited

U.S. PATENT DOCUMENTS

| | | | | |
|---|---|---|---|---|
| 5,057,996 A | * | 10/1991 | Cutler et al. | 718/106 |
| 5,421,014 A | * | 5/1995 | Bucher | 718/100 |
| 5,613,114 A | * | 3/1997 | Anderson et al. | 718/108 |
| 5,752,031 A | * | 5/1998 | Cutler et al. | 718/103 |
| 5,768,587 A | * | 6/1998 | Freund et al. | 718/101 |
| 5,790,789 A | * | 8/1998 | Suarez | 709/202 |
| 5,815,727 A | * | 9/1998 | Motomura | 712/1 |
| 5,872,971 A | * | 2/1999 | Knapman et al. | 718/101 |
| 6,003,061 A | * | 12/1999 | Jones et al. | 718/104 |
| 6,026,424 A | * | 2/2000 | Circenis | 718/104 |
| 6,026,428 A | * | 2/2000 | Hutchison et al. | 718/108 |
| 6,125,382 A | * | 9/2000 | Brobst et al. | 718/102 |
| 6,233,585 B1 | * | 5/2001 | Gupta et al. | 707/103 R |
| 6,260,057 B1 | * | 7/2001 | Eykholt et al. | 718/102 |
| 6,269,391 B1 | * | 7/2001 | Gillespie | 718/100 |
| 6,349,312 B1 | * | 2/2002 | Fresko et al. | 707/205 |
| 6,411,983 B1 | * | 6/2002 | Gallop | 718/104 |
| 6,519,605 B1 | * | 2/2003 | Gilgen et al. | 707/103 R |
| 6,639,687 B1 | * | 10/2003 | Neilsen | 358/1.14 |
| 6,687,729 B1 | * | 2/2004 | Sievert et al. | 718/102 |
| 6,691,304 B1 | * | 2/2004 | Zhang et al. | 717/127 |
| 6,721,777 B1 | | 4/2004 | Sharma | |
| 6,766,349 B1 | * | 7/2004 | Belkin | 718/104 |
| 6,778,990 B2 | | 8/2004 | Garcia et al. | |
| 6,832,238 B1 | | 12/2004 | Sharma et al. | |
| 6,886,041 B2 | | 4/2005 | Messinger et al. | |
| 6,976,061 B1 | | 12/2005 | Sharma | |
| 6,990,669 B1 | * | 1/2006 | Ballantyne | 718/108 |
| 7,007,075 B1 | | 2/2006 | Coffey | |
| 7,036,110 B2 | | 4/2006 | Jeyaraman | |

(Continued)

OTHER PUBLICATIONS

"OA mailed Sep. 13, 2007 for U.S. Appl. No. 10/858,661".

(Continued)

*Primary Examiner*—Meng-Ai An
*Assistant Examiner*—Abdullah Al Kawsar
(74) *Attorney, Agent, or Firm*—Schwegman, Lundberg & Woessner, P.A.

(57) ABSTRACT

A system and method for identification of the execution context of a thread is disclosed. Under an embodiment of the invention, a method comprises associating a program object with a program thread; storing information concerning the program thread in the program object; and retrieving the information concerning the program thread upon request.

13 Claims, 6 Drawing Sheets

U.S. PATENT DOCUMENTS

| | | | |
|---|---|---|---|
| 7,036,124 B1* | 4/2006 | Patterson | 718/104 |
| 7,080,119 B2 | 7/2006 | Felt et al. | |
| 7,089,317 B2 | 8/2006 | Jeyaraman et al. | |
| 7,089,584 B1 | 8/2006 | Sharma | |
| 7,100,162 B2* | 8/2006 | Green et al. | 718/102 |
| 7,191,441 B2* | 3/2007 | Abbott et al. | 718/1 |
| 7,206,805 B1* | 4/2007 | McLaughlin, Jr. | 709/203 |
| 7,246,353 B2* | 7/2007 | Forin et al. | 718/100 |
| 7,318,128 B1* | 1/2008 | Dice | 711/151 |
| 7,406,542 B2* | 7/2008 | Erlingsson | 709/246 |
| 7,444,620 B2* | 10/2008 | Marvin | 717/116 |
| 7,493,622 B2* | 2/2009 | Borkan | 719/310 |
| 7,496,654 B2* | 2/2009 | Corbin et al. | 709/224 |
| 2001/0056457 A1* | 12/2001 | Kikuchi et al. | 709/104 |
| 2002/0046230 A1* | 4/2002 | Dieterich et al. | 709/107 |
| 2002/0107872 A1 | 8/2002 | Hudis et al. | |
| 2002/0144002 A1 | 10/2002 | Matena et al. | |
| 2003/0023599 A1 | 1/2003 | Garcia et al. | |
| 2003/0074217 A1 | 4/2003 | Beisiegel et al. | |
| 2003/0093402 A1 | 5/2003 | Upton et al. | |
| 2003/0145074 A1 | 7/2003 | Penick | |
| 2003/0182426 A1 | 9/2003 | Hapner et al. | |
| 2003/0191803 A1 | 10/2003 | Chinnici et al. | |
| 2003/0229888 A1 | 12/2003 | Spotwood et al. | |
| 2003/0236923 A1 | 12/2003 | Jeyaraman et al. | |
| 2004/0015859 A1 | 1/2004 | Potter et al. | |
| 2004/0015974 A1 | 1/2004 | Jeyaraman | |
| 2004/0078495 A1 | 4/2004 | Mousseau et al. | |
| 2004/0098726 A1 | 5/2004 | Currie et al. | |
| 2004/0109413 A1 | 6/2004 | Hierholzer et al. | |
| 2004/0172639 A1 | 9/2004 | Lou et al. | |
| 2004/0215473 A1 | 10/2004 | Bhogi et al. | |
| 2004/0244004 A1 | 12/2004 | Pardon et al. | |
| 2005/0060169 A1 | 3/2005 | Gangadharan et al. | |
| 2005/0222689 A1* | 10/2005 | Smith et al. | 700/1 |
| 2005/0240663 A1 | 10/2005 | Wolber et al. | |
| 2006/0041662 A1 | 2/2006 | Georgiev et al. | |
| 2006/0075115 A1 | 4/2006 | Chitilian et al. | |

OTHER PUBLICATIONS

"OA Mailed Dec. 28, 2007 for U.S. Appl. No. 10/861,267", (Dec. 28, 2007), Whole Document.

"OA mailed Dec. 14, 2007 for U.S. Appl. No. 10/863,159".

DeMichiel, Linda, et al., JSR 220: Enterprise JavaBeansTM, Version 3.0, EJB.

Core Contracts and Requirements, *Sun Microsystems, EJB 3.0 Expert Group*, (May 2, 2006), Whole Document.

DeMichiel, Linda, et al., "JSR 220: Enterprise JavaBeansTM, Version 3.0, Java Persistence API", *Sun Microsystems, EJB 3.0 Expert Group*, (May 2, 2006), Whole Document.

Shannon, Bill, "JavÂ 2 Platform, Enterprise Edition Specification, v1.4", *Sun Microsystems*, (Nov. 24, 2003), Whole Document.

"Final Office Action Mailed Apr. 4, 2008 for U.S. Appl. No. 10/858,661", (Apr. 4, 2008), Whole Document.

Sun Microsystems, "Sun Trademarks", http://www.sun.com/suntrademarks/, (Printed / Downloaded Jan. 15, 2009), 1-6.

USPTO, "OA Mailed Aug. 11, 2008 for U.S. Appl. No. 10/856,249", (Aug. 11, 2008), Whole Document.

USPTO, "OA Mailed Sep. 18, 2008 for U.S. Appl. No. 10/858,661", (Sep. 18, 2008), Whole Document.

USPTO, "OA Mailed Sep. 3, 2008 for U.S. Appl. No. 10/858,657", (Sep. 3, 2008), Whole Document.

USPTO, "FOA Mailed Jul. 9, 2008 for U.S. Appl. No. 10/861,267", (Jul. 9, 2008), Whole Document.

* cited by examiner

IDENTIFICATION OF EXECUTION CONTEXT

TECHNICAL FIELD

Embodiments of the invention generally relate to the field of computer systems and, more particularly, to a system and method for identification of the execution context of a thread.

BACKGROUND

In computer operations, including client/server systems, a thread is a particular set of instructions. In a Java™ environment, a thread is the basic unit of program execution. A process may include multiple threads running concurrently, possibly with each thread being involved with a different task. Each thread may operate largely independently from the other active threads.

In monitoring operations of a system, the identity of elements that are working with an active thread may be useful information. For example, a thread may be connected with a particular program component or software unit and with a particular transaction. In a Java environment, a transaction is unit of work that modifies data, which may include one or more program statements. However, a thread may work with numerous different components and transactions, with the components and transactions that are connected with the thread varying over time.

In conventional operations, it is not generally possible to directly identify a component or transaction that is working within a thread at a particular time. Therefore, ability to monitor of a system may be limited and operations may need to rely on external evidence of system processes.

SUMMARY OF THE INVENTION

A system and method for identification of the execution context of a thread is described.

In a first embodiment of the invention a method comprises associating a program object with a program thread; storing information concerning the program thread in the program object; and retrieving the information concerning the program thread upon request.

In a second embodiment of the invention a system comprises a processor, the processor to execute an application, the execution of the application to include the execution of a program thread; and a memory, the memory to store a program component, the program component to include the information regarding the current execution environment for the program thread.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for identification of the component execution context of a thread.

Under an embodiment of the invention, a component is attached to the context of a program thread. In this embodiment, the component contains information regarding the execution context. Under an embodiment of the invention, the object comprises a resource set for the thread.

Under an embodiment of the invention, an interface is provided to enable a user of a system to obtain runtime information about the process of request execution. Under an embodiment of the invention, a process provides for retrieving the existing context for a thread to provide execution context data and replacing such context as the execution of the thread proceeds.

Under an embodiment of the invention, the component and transaction that are currently with a particular thread are identified. Under an embodiment of the invention, an object is attached to the thread context of a thread and this object is utilized to maintain identity information for the thread. Under an embodiment of the invention, an object associated with a program thread carries information regarding the application that is working within the thread. The object may be referred to herein as the component execution context.

In a Java environment, a thread is a single sequential flow of control within a program, representing a thread of execution in a program. In a Java virtual machine, an application may have multiple threads of execution running wholly or partially concurrently. A thread may be referred to as an execution context or a lightweight process. A thread may be utilized to isolate tasks.

However, while threads are said to be concurrent, a computer may have only one physical or logical processor, or fewer processors than the number of threads, so threads actually must share a central processing unit (CPU) with other threads. The execution of multiple threads when sharing one or more CPUs in some order is referred to as scheduling. For example, the Java runtime supports a deterministic scheduling algorithm known as fixed priority scheduling. In this environment, each thread has a priority. Threads with higher priority are executed in preference to threads with lower priority according to the scheduling algorithm.

An embodiment of the invention may operate in a Java environment, such as described in the Java 2 Platform, Enterprise Edition J2EE™ environment provided under the J2EE specification, J2EE (Java 2 Platform, Enterprise Edition), including as provided in the J2EE specification, version 1.4, Nov. 24, 2003. An application sewer is a term used to indicate a component sewer that is compliant with the J2EE environment. In such environment, the application sewer dispatches threads to execute submitted work instances.

Under an embodiment of the invention, an interface may be provided to provide runtime information regarding the execution process. Under an embodiment of the invention, an object associated with a program thread may contain one or more methods to provide information regarding the current execution environment at some point in time. Certain conventional methods involve the context of a thread. For example, current( ) returns the current context for the current thread. Under an embodiment of the invention, a method will further allow a user to obtain additional data, which may include the name of the application, component, or method currently working within a thread; to retrieve the transaction associated with the current thread; to identify the isolation level of the underlying back end system; to manage the object; and additional methods regarding the current execution context.

In addition to ensuring the full completion or rollback of statements that it encloses, a transaction isolates the data modified by these statements. The isolation level describes how visible data being updated is to other transactions. Said in another way, the isolation level is the degree to which the intermediate state of the data being modified by a transaction is visible to other concurrent transactions and data being modified by other transactions is visible to it.

In a Java environment, an application is a program, such as a program running on a server system. An application may reside in a container, the container being an entity that manages life cycle, security, deployment, and runtime services for a component. Under an embodiment of the invention, a component execution context may be utilized by various applications contained on a server, including a sewer that is compatible with the J2EE specification. The applications may include applications utilizing components contained in an Enterprise JavaBean™ (EJB) container and a web container. In this context, a component is a software-unit supported by a container, with components generally being either enterprise beans Enterprise JavaBeans, web components, applets, or application clients.

A program object representing the component execution context may comprise a resource set. Generally a resource set is a program object that keeps handle wrappers. Handle wrappers are the wrappers of connection handles opened by an application component to shared and unshared resources. The resource set also contains information about the application, the program component and the method that uses the resources, and the transactions in which the program component is used. In general terms, a wrapper is an object that encapsulates another object and delegates to the object in some way to alter its interface or behavior.

Figure 1:
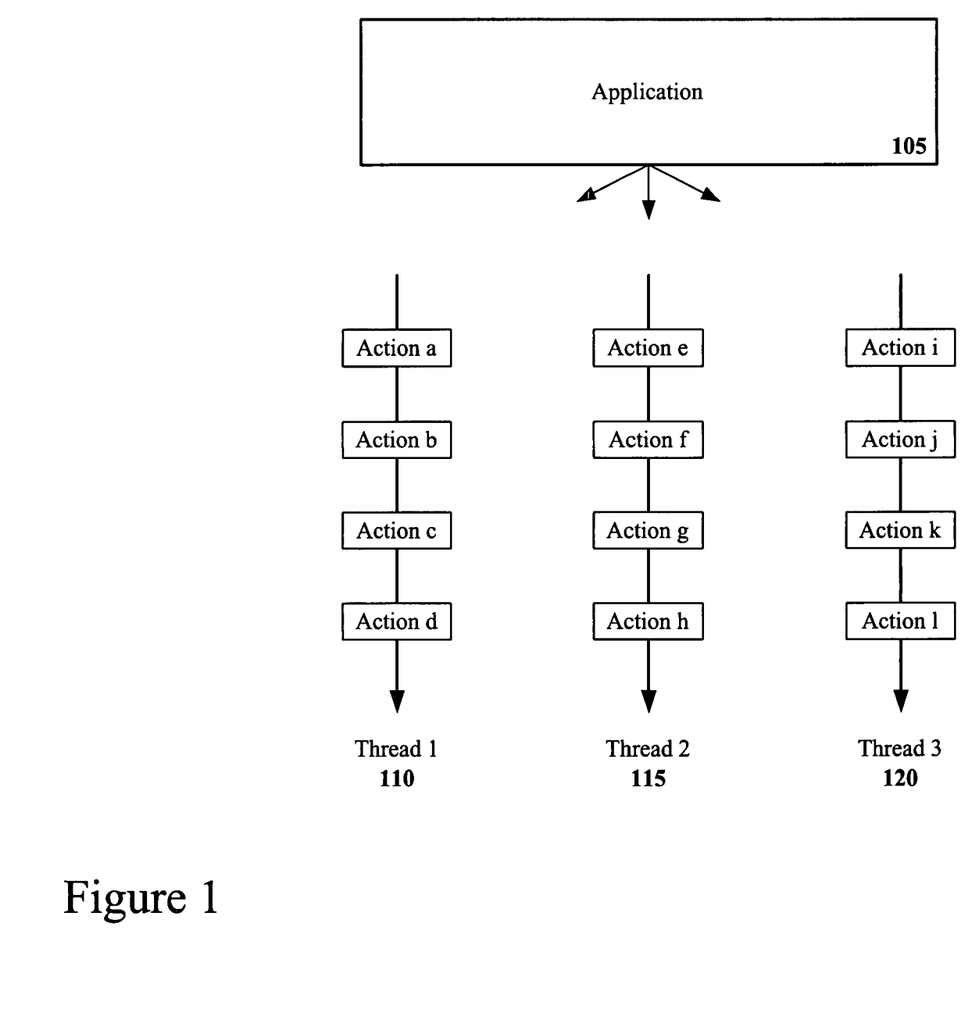
FIG. 1 is an illustration of an embodiment of a multi-threaded application.

FIG. 1 is an illustration of an embodiment of a multi-threaded application. In this illustration, an application 105, which may include an application on a Java compatible server, includes multiple threads, shown as thread 1 110, thread 2 115, and thread 3 120. Each thread represents a sequential flow of control within a program. Each thread may be independent and may be executed wholly or partially concurrently with the other threads. In the illustration, each thread is illustrated as taking multiple actions in parallel with the other threads. As indicated above, the individual instructions for each may actually be executed according to some priority schedule. Under an embodiment of the invention, one or more of the threads includes a component execution context, the component execution context including information regarding the current execution of the thread.

Figure 2:
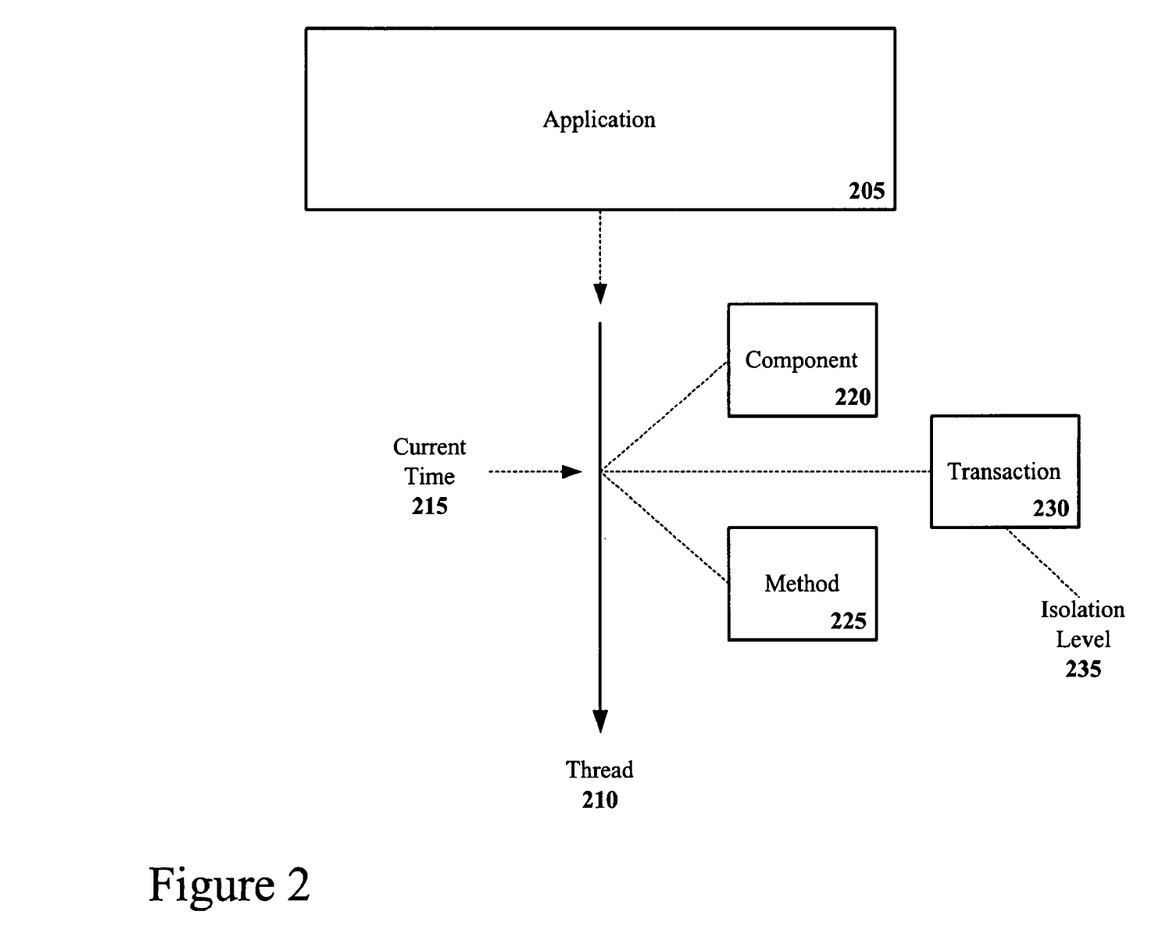
FIG. 2 is an illustration of an embodiment of thread execution.

FIG. 2 is an illustration of an embodiment of thread execution. In this illustration, an application 205 includes a thread 210, which may be executed wholly or partially in parallel with other threads. Under an embodiment of the invention, information regarding the execution of the thread 210 can be obtained. For example, at a particular current time 215, one or more methods may provide the name of the currently operating component 220 or method 225. Further, one or methods may retrieve a currently operating transaction 230, as well as the isolation level 235 of the current transaction 235.

Figure 3:
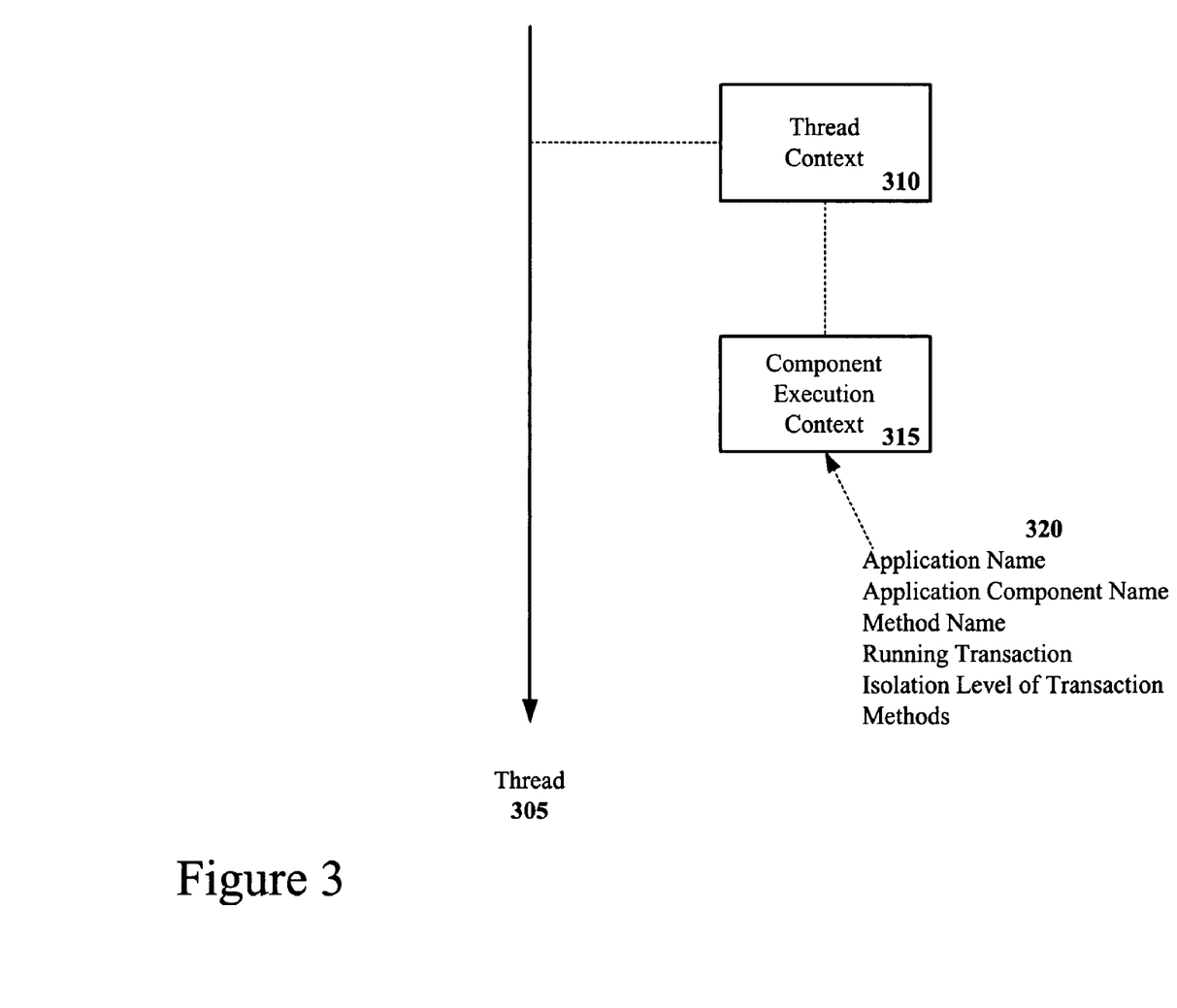
FIG. 3 is an illustration of an embodiment of a thread with a component execution context.

FIG. 3 is an illustration of an embodiment of a thread with a component execution context. In this illustration, an application, such as a Java application residing on a server, includes a thread 305 representing a sequential flow of control for the application. The thread includes a thread context 310.

Under an embodiment of the invention, an object representing component execution context 315 is attached to the thread context 310. Under an embodiment of the invention, the component execution context comprises a resource set for the thread. The component execution thread 315 includes certain information regarding the execution of the thread and includes certain methods to be utilized in obtaining information about component execution. The contents 320 of the component execution context 315 may include the name of the application, the name of the current application component, and the name of the current method. The contents 320 may also provide access to the currently running transaction and the isolation level of such transaction.

Figure 4:
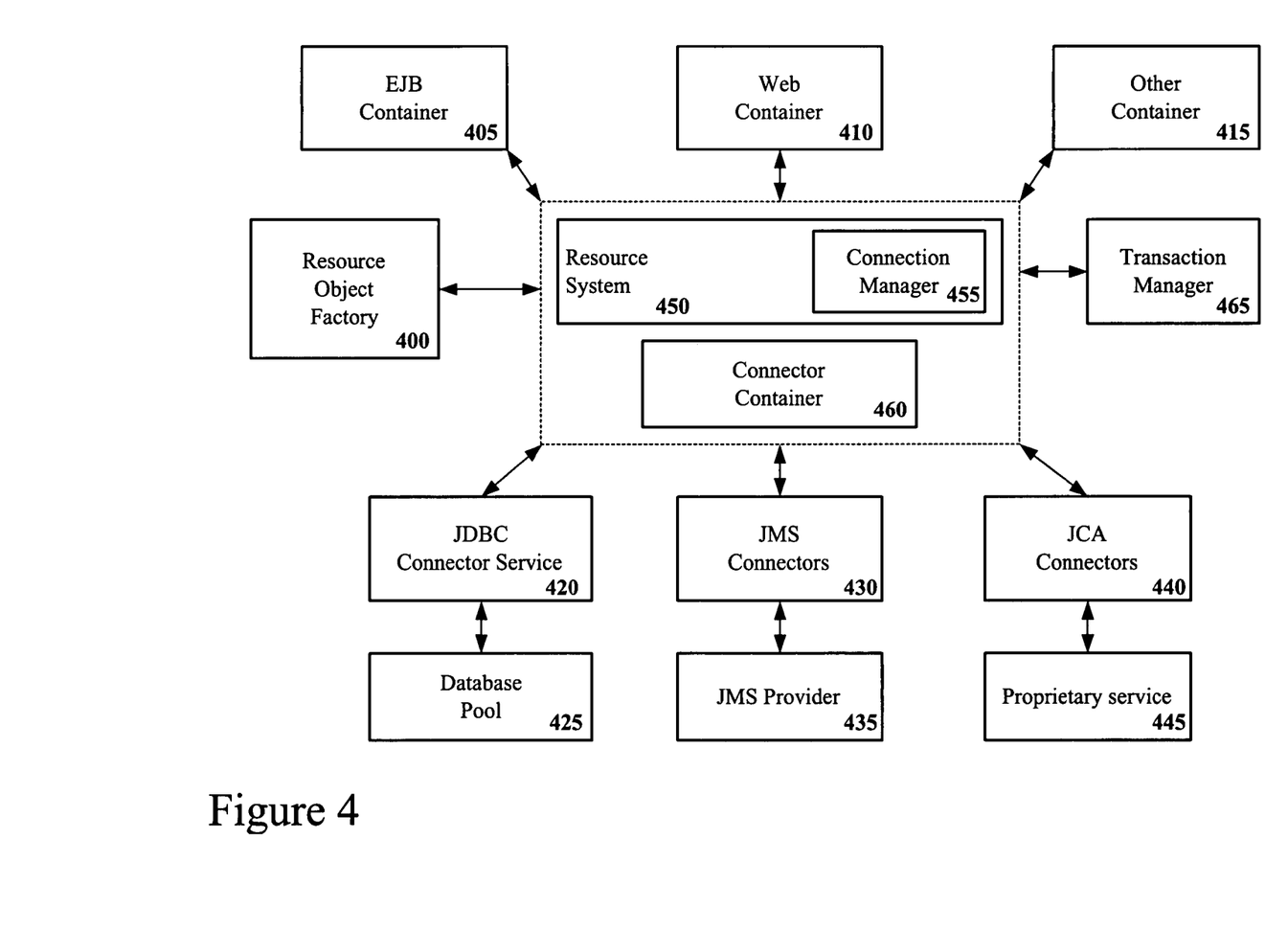
FIG. 4 is an illustration of an embodiment of a server utilizing a component execution context.

FIG. 4 is an illustration of an embodiment of a server utilizing a component execution context. In this illustration, program object containers include an Enterprise JavaBean (EJB) container 405, a web container 410, and another arbitrary container 415. Each such container may include one or more applications. The operation of such applications may include one or more threads. Under an embodiment of the invention, a thread may include an object to identify information regarding the execution of the thread by the server. Under an embodiment of the invention, the object comprises a resource set for the thread and is attached to the thread context.

In FIG. 4, the server includes connections to external resources, which may include a database pool 425 that may be connected using a JDBC™ (Java Database Connectivity) connector server 420, a JMS (Java message service provider) 435 that may be connected utilizing JMS connectors 430, and a proprietary service 445 that may be connected using JCA (Java connector architecture) connectors 440. The server may include a resource system 450 for use in providing connections between applications and external resources. The resource system 450 may include a connection manager 455, and may utilize a connector container 460 to store managed connections. A transaction manager 465 maintains a relationship with the resource system 450. Under an embodiment of the invention, a resource object factory 400 is present to assist the resource system 450 in the creation of connection factories for applications.

Figure 5:
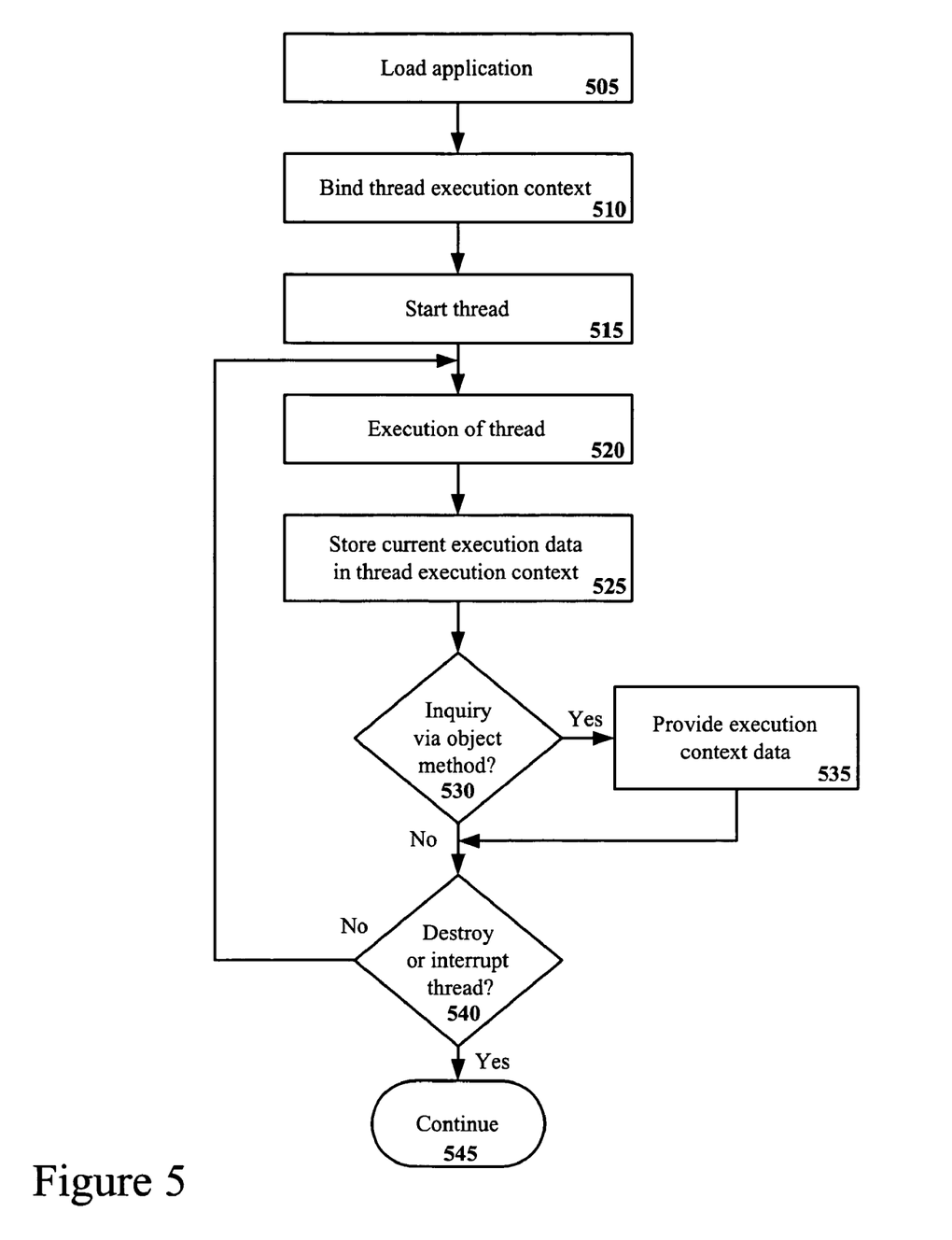
FIG. 5 is a flow chart illustrating an embodiment of identification of execution context.

FIG. 5 is a flow chart illustrating an embodiment of identification of execution context. In this illustration, an application is loaded 505. As a part of such process, a thread execution context is bound 510. Under an embodiment of the invention, the thread execution context is an object that contains information regarding a program thread. Under an embodiment of the invention, the thread execution context is attached to the context of the thread. In FIG. 5, a program thread is started. The thread may include a thread in a Java environment, such as a thread running on a J2EE compatible system. Execution of the thread is begun 520. Under an embodiment of the invention, data regarding the current execution process is stored in the thread execution context 525. Under an embodiment of the invention, the data stored includes the name of the application, application component, or method currently being executed. The data may further include data regarding the current transaction and the isolation level of such context. In other embodiments, additional information may also be included.

In an embodiment of the invention, the component execution context object includes one or methods to allow a user to access information regarding the current execution environment. If an inquiry regarding the component execution context is received 530, the execution context data is provided 535. The thread may be destroyed (halted) or interrupted at some point in its operation, which will indicate that the application will continue as programmed 545. If the thread remains active, the process continues with the thread execution 520 and with the storing of current execution data 525.

Figure 6:
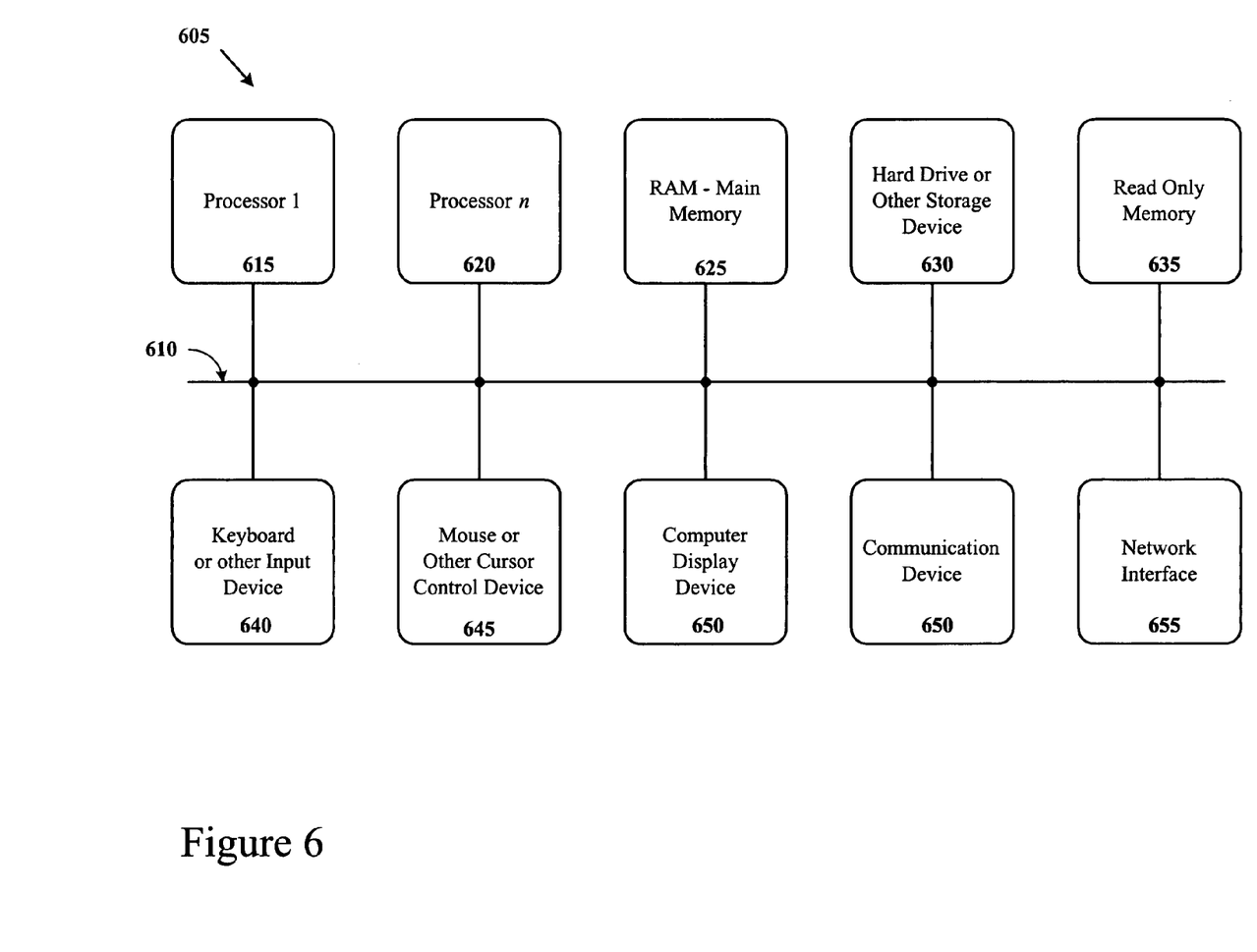
FIG. 6 illustrates an embodiment of an exemplary computer system environment.

FIG. 6 illustrates an embodiment of an exemplary computer system environment. In this illustration, a computer 605 comprises a bus 610 or other means for communicating data. The computer 605 includes one or more processors, illustrated as shown as processor 1 615 through processor n 620 to process information.

The computer 605 further comprises a random access memory (RAM) or other dynamic storage as a main memory 625 to store information and instructions to be executed by the processor 615 through 620. The RAM or other main memory 625 also may be used for storing temporary variables or other intermediate information during execution of instructions by the processors 615 through 620.

A hard drive or other storage device 630 may be used by the computer 605 for storing information and instructions. The storage device 630 may include a magnetic disk or optical disc and its corresponding drive, flash memory or other non-volatile memory, or other memory device. Such elements may be combined together or may be separate components. The computer 605 may include a read only memory (ROM) 635 or other static storage device for storing static information and instructions for the processors 615 through 620.

A keyboard or other input device 640 may be coupled to the bus 610 for communicating information or command selections to the processors 615 through 620. The input device 640 may include a keyboard, a keypad, a touch-screen and stylus, a voice-activated system, or other input device, or combinations of such devices. The computer may further include a mouse or other cursor control device 645, which may be a mouse, a trackball, or cursor direction keys to communicate direction information and command selections to the processors and to control cursor movement on a display device. The computer 605 may include a computer display device 650, such as a cathode ray tube (CRT), liquid crystal display (LCD), or other display technology, to display information to a user. In some environments, the display device may be a touch-screen that is also utilized as at least a part of an input device. In some environments, the computer display device 650 may be or may include an auditory device, such as a speaker for providing auditory information.

A communication device 650 may also be coupled to the bus 610. The communication device 650 may include a modem, a transceiver, a wireless modem, or other interface device. The computer 605 may be linked to a network or to other device using via an interface 655, which may include links to the Internet, a local area network, or another environment. The computer 605 may comprise a server that connects to multiple devices. In one embodiment the computer 605 comprises a Java compatible server that is connected to user devices and to external resources.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
    associating a program object with a Java™ program thread in a J2EE™ (Java 2 Platform, Enterprise Edition) compatible environment, the program thread comprising a set of application instructions for execution by a processor, associating the program object with the program thread including attaching the program object to a context of the program thread;
    storing information concerning the execution context of the program thread in the program object, the program object comprising a resource set for the program thread having information describing a current execution context for the program thread, the information including identification of any application, component, or method that is currently working within the program thread and identification of any transaction currently associated with the program thread, the program object containing one or more methods for obtaining the stored information regarding the current execution context;
    replacing the resource set with a new resource set upon a change in the execution context for the program thread;
    receiving a request for execution context data from a user utilizing a method of the one or more methods for obtaining the stored information; and
    retrieving the information concerning the program thread in response to the request, wherein retrieving the information comprises,
    retrieving the resource set currently stored for the program thread;
    opening an interface for the program thread;
    receiving a request for data regarding the program thread via the interface; and
    providing the requested data from the information concerning the program thread that is stored in the program object.

2. The method of claim 1, wherein the resource set includes wrappers of connection handles for resources that have been opened.

3. The method of claim 1, wherein the information further includes an isolation level of the transaction that is currently associated with the program thread, wherein the isolation level of the transaction describes a degree to which data modified in the transaction is visible to another concurrent transaction or a degree to which data modified in another transaction is visible to the transaction.

4. A system comprising:
    a processor, the processor to execute an application, the execution of the application to include the execution of a program thread, the program thread being a Java™ program thread in a J2EE™ (Java 2 Platform, Enterprise Edition) compatible environment, the program thread comprising a set of application instructions for execution; and a memory, the memory to store a program component, the program component to include information regarding a current execution environment for the program thread, the information including identification of any application, component, or method that is currently working within the program thread and identification of a transaction currently associated with the current thread, the program component comprising a resource set for the program thread, the program object being attached to a context of the program thread and containing one or more methods for obtaining the stored information regarding the current execution context; and wherein the processor is to replace the resource set with a new resource set upon a change in the execution context for the program thread and to retrieve information from the program component in response to a request for information regarding the program thread in accordance with a method of the one or more methods for obtaining the stored information, retrieving the information comprising retrieving the resource set currently stored for the program thread, opening an interface for the program thread, receiving a request for data regarding the program thread via the interface, and providing the requested data from the information stored in the program object.

5. The system of claim 4, wherein the system comprises a server.

6. The system of claim 4, wherein the system comprises a container, the container including one or more program components for the application.

7. The system of claim 6, wherein the container comprises an Enterprise JavaBean™ (EJB) container.

8. The system of claim 6, wherein the container comprises a web container.

9. The system of claim 4, wherein the resource set includes wrappers of connection handles for resources that have been opened.

10. The system of claim 4, wherein the information further includes an isolation level of the transaction that is currently running, wherein the isolation level of the transaction describes a degree to which data modified in the transaction is visible to another concurrent transaction or a degree to which data modified in another transaction is visible to the transaction.

11. A storage medium having stored thereon data representing sequences of instructions that, when executed by a processor, cause the processor to perform operations comprising:

associating a program object with a Java™ program thread in a J2EE™ (Java 2 Platform, Enterprise Edition) compatible environment, the program thread comprising a set of instructions for execution by a processor, associating the program object with the program thread including attaching the program object to a context of the program thread;

storing information concerning the execution context of the program thread in the program object, the program object comprising a resource set for the program thread having information describing a current execution context for the program thread, the information including identification of any application, component, or method that is currently working within the program thread and identification of a transaction currently associated with the current thread, the program object containing one or more methods for obtaining the stored information regarding the current execution context;

replacing the resource set with a new resource set upon a change in the execution context for the program thread;

receiving a request for execution context data from a user utilizing a first method of the one or more methods for obtaining the stored information; and retrieving the information concerning the program thread in response to the request, wherein retrieving the information comprises, retrieving the resource set currently stored for the program thread, opening an interface for the program thread, receiving a request for data regarding the program thread via the interface, and providing the requested data from the information concerning the program thread that is stored in the program object.

12. The medium of claim 11, wherein the resource set includes wrappers of connection handles for resources that have been opened.

13. The medium of claim 11, wherein the information further includes an isolation level of the transaction that is currently associated with the program thread, wherein the isolation level of the transaction describes a degree to which data modified in the transaction is visible to another concurrent transaction or a degree to which data modified in another transaction is visible to the transaction.

* * * * *